US009279506B2

(12) United States Patent
Jensen et al.

(10) Patent No.: US 9,279,506 B2
(45) Date of Patent: Mar. 8, 2016

(54) ROTARY DISTRIBUTION APPARATUS

(75) Inventors: Craig Jensen, Umdloti Beach (ZA); Leon Smith, Kwazulu Natal (ZA)

(73) Assignee: Tongaat Hulett Limited, Kwazulu Natal (ZA)

( * ) Notice: Subject to any disclaimer, the term of this patent is extended or adjusted under 35 U.S.C. 154(b) by 0 days.

(21) Appl. No.: 14/128,667

(22) PCT Filed: Jun. 22, 2012

(86) PCT No.: PCT/IB2012/053167
§ 371 (c)(1),
(2), (4) Date: Dec. 23, 2013

(87) PCT Pub. No.: WO2013/001428
PCT Pub. Date: Jan. 3, 2013

(65) Prior Publication Data
US 2014/0144532 A1    May 29, 2014

(30) Foreign Application Priority Data

Jun. 27, 2011    (ZA) .................... 2011/04747

(51) Int. Cl.
*F16K 11/072*    (2006.01)
*F16K 11/074*    (2006.01)
*F16K 11/076*    (2006.01)

(52) U.S. Cl.
CPC ............. *F16K 11/072* (2013.01); *F16K 11/074* (2013.01); *F16K 11/076* (2013.01); *Y10T 137/86863* (2015.04)

(58) Field of Classification Search
CPC ..... F16K 11/06; F16K 11/072; F16K 11/074; F16K 11/076
USPC .................................................... 137/625.46
See application file for complete search history.

(56) References Cited

U.S. PATENT DOCUMENTS

| 2,600,102 | A | * | 6/1952 | Fawick | 137/580 |
| 3,246,667 | A | * | 4/1966 | Pemberton | 137/312 |
| 3,430,879 | A | * | 3/1969 | Boyer | 242/324.3 |

(Continued)

FOREIGN PATENT DOCUMENTS

| DE | 102005003983 A1 * | 8/2006 |
| WO | WO 2004/029490 | 4/2004 |
| WO | WO 2007/031857 | 3/2007 |

OTHER PUBLICATIONS

International Search Report issued in International Application No. PCT/IB2012/053167 and mailed on Oct. 2, 2012.

*Primary Examiner* — John K Fristoe, Jr.
*Assistant Examiner* — Christopher Ballman
(74) *Attorney, Agent, or Firm* — Buchanan Ingersoll & Rooney PC

(57) ABSTRACT

A rotary distribution apparatus includes a stationary, cylindrical inner core (27), and a rotatable, cylindrical outer shell (25) disposed about the inner core with the inner core (27) and the outer shell defining a plurality of annular fluid distribution chambers therebetween. The apparatus furthermore includes a rotatable indexing disc (23) having a plurality of flow passages provided therethrough, connection ports of which are in flow communication with ports in the outer shell (25), and a stationary indexing disc (22) having a plurality of flow passages provided therethrough, connection ports of which are in flow communication with suitable process vessels. The rotary distribution apparatus includes a driving arrangement that comprises a stationary shaft (28) to which the stationary core (27) is secured and a rotatable sleeve (24) rotatable about the stationary shaft (28), the rotatable sleeve (24) driving the rotatable outer shell (25) and the rotatable indexing disc (23).

8 Claims, 2 Drawing Sheets

(56) References Cited

U.S. PATENT DOCUMENTS

| | | | |
|---|---|---|---|
| 3,713,538 A * | 1/1973 | Kass | 210/138 |
| 5,462,085 A | 10/1995 | Iwata et al. | |
| 5,741,078 A * | 4/1998 | Sasaki | 384/43 |
| 5,931,194 A * | 8/1999 | Raque | F16K 11/074 137/625.11 |
| 6,290,363 B1 * | 9/2001 | Masutani | 359/856 |
| 2006/0124177 A1 * | 6/2006 | Jensen et al. | 137/580 |
| 2007/0068307 A1 * | 3/2007 | Mann | 74/480 R |

\* cited by examiner

ROTARY DISTRIBUTION APPARATUS

CROSS-REFERENCE TO RELATED APPLICATIONS

This application is a U.S. National Stage patent application pursuant to 35 U.S.C. §371 of International Patent Application PCT/IB2012/053167, filed on Jun. 22, 2012, and published as WO 2013/001428 on Jan. 3, 2013, which claims priority to South African Patent Application No. 2011/04747 filed on Jun. 27, 2011, the content of each is hereby expressly incorporated by reference in their entireties for all purposes.

BACKGROUND TO THE INVENTION

THIS invention relates to a rotary distribution apparatus and more particularly, but not exclusively, to a rotary distribution apparatus suitable for use in a sugar refinement process.

In many processes it is necessary sequentially to connect different feed conduits and discharge conduits to process chambers of equipment. One typical approach is to use a plurality of conduits and valves to achieve the desired flow distribution between the various chambers. However, as the numbers of feed and discharge conduits and/or the number of process chambers are increased, the use of conventional piping and valves becomes cumbersome due to complexity, space and cost considerations. Although the number of valves may be reduced, through the use of multi-port valves at each process chamber, the complexities of the piping arrangement remains.

An alternative manner in which the above process requirements can be achieved is by utilizing a rotary distribution apparatus, as disclosed in the Applicant's prior patent. WO2004/029490 entitled "Rotary Distribution Apparatus", the content of which is incorporated herein by reference. Further refinements and variations of such rotary distribution apparatus is also disclosed in the Applicant's patents WO2007/031857 entitled "Indexing Arrangement", and WO2009/127978 entitled "Rotary Distribution Apparatus Incorporating Interstage Pumps", the contents of which is also incorporated herein by reference.

One embodiment of an existing rotary distribution apparatus, which has applications in continuous ion-exchange, adsorption and chromatographic separation processes, is shown in FIG. 1. The apparatus has a stationary, cylindrical central core 1 into which fixed feed and product pipes 2 extend. A set of annular fluid distribution chambers 3 are defined between the core 1 and an outer barrel (or shell) 4 which rotates around the core with, in practice, one distribution chamber per feed or product stream. Pipes 5 which rotate with the barrel 4 are connected between selected distribution chambers and selected ports in the indexing disc 6 which rotates with the barrel. The indexing disc 6 rotates relative to a stationary disc 7 which is connected by stationary piping 8 to multiple process chambers 9. Fluid streams enter the rotary distribution apparatus through pipes 2 within the central core 1 and are then supplied via the rotating piping 5 to the indexing disc 6, and then via the stationary disc 7 and the stationary piping 8 to the selected process chambers 9. The fluid streams return from the process chambers and follow a similar route in reverse and are eventually discharged from the apparatus through the fixed pipes 2. Rotation of the indexing disc 6 results in the flow being directed to selected process chambers, which are in flow communication with the stationary disc.

A bearing and drive arrangement is required to maintain alignment and a sealing pressure between the indexing and stationary discs. In the standard rotary distribution arrangement design a slew ring 10 is bolted to the stationary disc and the indexing disc. The slew ring has an external gear 11 which is used to drive the unit. The use of a slew ring has the advantage that the area at the centre of the discs is left clear for the feed and product pipes to enter the central core from either or both the top or the bottom. In the standard design the barrel is mounted on top of the discs.

A consequence of this design (and the sealing system) is that pipes connecting the rotating and stationary discs have to be orientated in a vertical direction, as the slew ring prevents horizontal, side-entry of pipes into the indexing discs. In certain, typically small scale, applications it becomes advantageous to have horizontal connections into the indexing or stationary discs, due to cost, complexity and space considerations. However, the use of a slew ring bearing makes this impractical.

It is accordingly an object of the invention to provide a new rotary distribution arrangement, and in particular a drive arrangement therefor, which that will, at least partially, alleviate the above disadvantages.

It is also an object of the invention to provide a new rotary distribution arrangement and in particular a drive arrangement therefor, which will be a useful alternative to existing rotary distributions arrangements and drive arrangements.

SUMMARY OF THE INVENTION

According to the invention there is provided a rotary distribution arrangement including:
  a stationary, cylindrical inner core;
  a rotatable, cylindrical outer shell disposed about the inner core;
    the inner core and the outer shell defining a plurality, of annular fluid distribution chambers therebetween;
  a rotatable indexing disc having a plurality of flow passages provided therethrough, connection ports of which are in flow communication with ports in the outer shell;
  a stationary indexing disc having a plurality of flow passages provided therethrough, connection ports of which are in flow communication with suitable process vessels;
    the flow passages in the rotatable indexing disc and the stationary indexing disc also having indexing ports, the configuration being such that the indexing ports in the rotatable indexing disc and the indexing ports in the stationary indexing disc are in use axially aligned, and wherein rotation of the rotatable indexing disc results in the indexing ports of the rotatable indexing disc being selectively in flow communication with selected indexing ports of the stationary indexing disc, so as to selectively alter the flow paths through the rotary distribution arrangement;
  characterized in that the rotary distribution arrangement includes a driving arrangement that comprises:
    a stationary shaft to which the stationary core is secured;
    a rotatable sleeve rotatable about the stationary shaft, the rotatable sleeve driving the rotatable outer shell and the rotatable indexing disc; and
    the stationary shaft and the rotatable sleeve being located inside, and on a central axis of, the rotary distribution arrangement, in order for no part of the driving arrangement to be located radially outwardly of the indexing discs.

There is provided for the rotatable sleeve to be driven by a driving means located axially outwardly of the stationary indexing disc.

The rotatable sleeve may be connected to a driving disc, which in turn drives the rotatable indexing disc and the rotatable outer shell.

There is also provided for the stationary shaft to extend through the driving means, and to be secured to a stationary structure.

In one embodiment the stationary structure may be a housing of a gearbox forming part of the driving means. In an alternative embodiment the stationary structure may be the stationary indexing disc.

A further feature of the invention provides for the connecting ports of the rotatable indexing disc and/or the stationary indexing disc to be located on circumferentially outer faces of the indexing discs.

BRIEF DESCRIPTION OF THE DRAWINGS

A preferred embodiment of the invention is described by way of a non-limiting example, and with reference to the accompanying drawings in which.

DETAILED DESCRIPTION OF INVENTION

Figure 1:
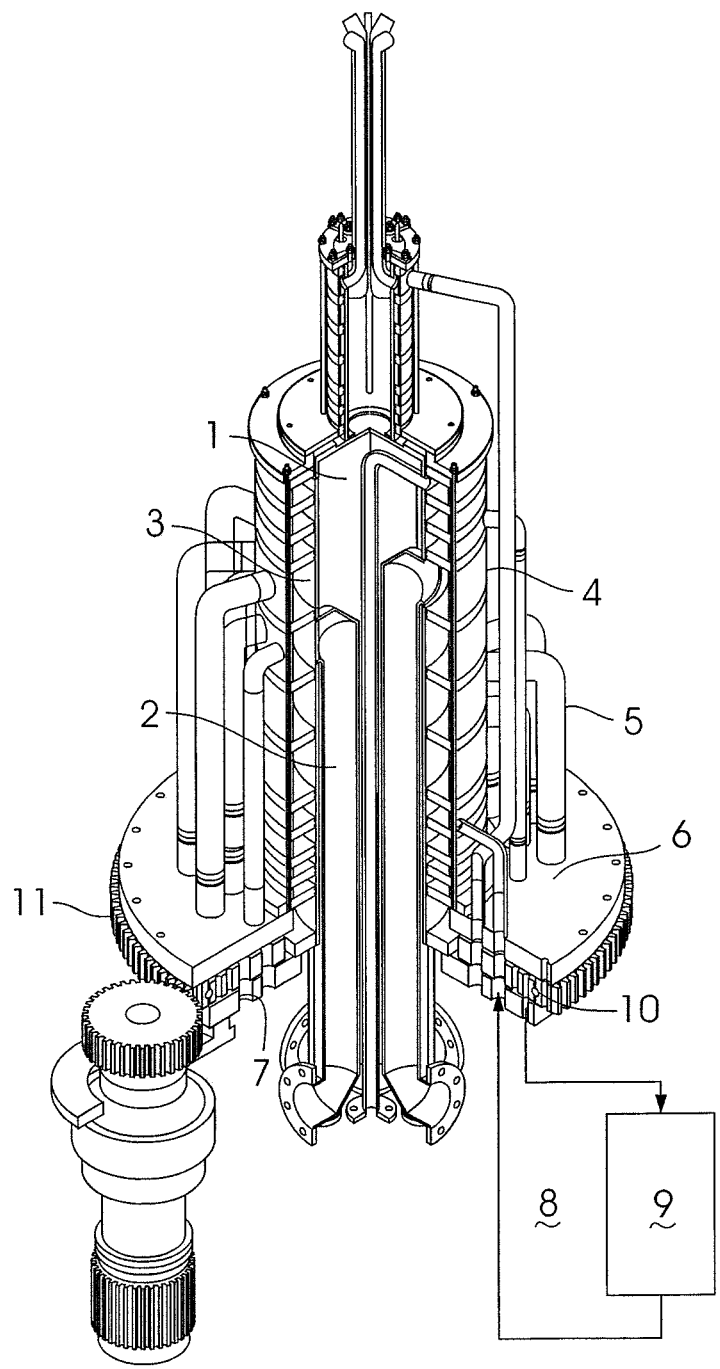
FIG. 1 is a perspective, partially cut-away view of one existing rotary distribution apparatus.

An existing rotary distribution apparatus, which has been described above, is shown in FIG. 1. Notably, the apparatus utilizes a slewing ring driving arrangement, a slewing ring of which is located adjacent the indexing discs, thus preventing the provision of connection ports on the outer peripheries of the indexing discs, and necessitating the use of vertically extending flow conduits into the indexing discs.

Figure 2:
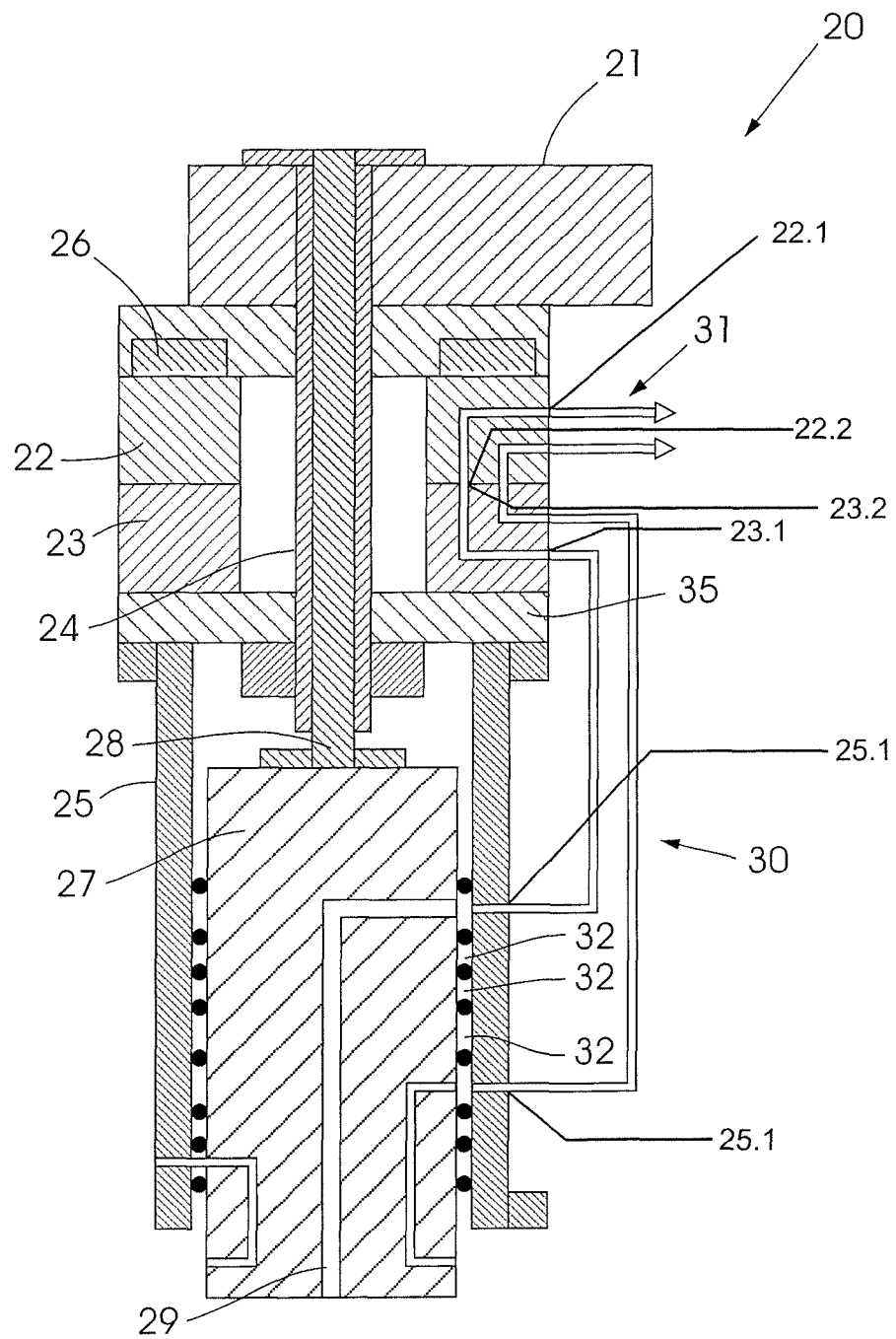
FIG. 2 is a schematic cross-sectional view of a new rotary distribution apparatus in accordance with the invention.

Referring now to FIG. 2, a non-limiting example of a new rotary distribution apparatus, which includes an alternative drive arrangement, is generally indicated by reference numeral 20.

The rotary distribution arrangement 20 includes a stationary, cylindrical inner core 27 and a rotatable, cylindrical outer shell 25 disposed about the inner core 27. The inner core 27 and the outer shell 25 define a plurality of annular fluid distribution chambers 32 therebetween. The rotary distribution arrangement also includes a rotatable indexing disc 23 having a plurality of flow passages provided therethrough, connection ports 23.1 of which are in flow communication with ports 25.1 in the outer shell 25. A stationary indexing disc 22 is located above the rotatable indexing disc 23, and includes a plurality of flow passages provided therethrough, connection ports 22.1 of which are in flow communication with suitable process vessels. The flow passages in the rotatable indexing disc 23 and the stationary indexing disc 22 also have indexing ports (23.2 and 22.2), the configuration being such that the indexing ports 23.2 in the rotatable indexing disc 23 and the indexing ports 22.2 in the stationary indexing disc 22 are in use axially aligned, and wherein rotation of the rotatable indexing disc 23 results in the indexing ports 23.1 of the rotatable indexing disc 23 being selectively brought in flow communication with selected indexing ports 22.2 of the stationary indexing disc 22, so as to selectively alter the flow paths through the rotary distribution apparatus 10.

In this new arrangement a driving means 21, in this embodiment in the form of a gearbox and bearing housing, is located operatively above the stationary indexing disc 22, and is supported by a suitable stationary structure (not shown).

The rotatable indexing disc 23 is positioned below the stationary indexing disc 22, and is connected to the output drive of the gearbox 21 via a drive sleeve or tube 24 which extends into the rotary distribution apparatus 20 through the annuli of the indexing discs (22 and 23). The rotatable outer shell or barrel 25 is connected to the rotatable indexing disc 23 and rotates with the rotatable indexing disc 23. More particularly, the end of the drive sleeve 24 is connected to a driving disc 35, which is in turn connected to the rotatable indexing disc 23 and the rotatable outer sleeve 25.

The sealing force between the indexing discs (22 and 23) is achieved by exerting air pressure onto either the rotatable indexing disc 23 or the stationary indexing disc via a pressure ring 26. The pressure ring 26 may be of many different configurations, and the invention is not limited to any particular design.

The stationary inner or central core 27 is secured to a stationary central shaft 28 that is located inside the drive tube 24 and which passes through the gearbox and is secured to the gearbox housing (or a similar stationary component). The drive tube 24 is configured to rotate about the stationary central shaft 28.

The feed and product pipes 29 are connected to the central core 27 at the end opposite to the stationary central shaft 28. The feed and product pipes 29 are in flow communication with annular fluid distribution chambers 32 formed by and located between the rotatable shell 25 and the stationary core 27. The fluid distribution chambers are in turn in flow communication with the rotatable indexing disc 23 by way of pipes 30 that are stationary relative to the rotating shell 25 and the rotatable indexing disc 23, and which therefore rotate about the rotary distribution apparatus 20 when the indexing disc 23 and shell 25 are rotated. Stationary pipes 31 extend from and into the stationary indexing disc 22, and provided flow communication between the rotary distribution apparatus 20 and any required process vessel (not shown).

The above configuration is advantageous in that the drive arrangement in the form of the rotatable sleeve 24) is housed inside the rotary distribution apparatus, with the driving means being located above or below the apparatus (depending on the orientation of the apparatus, it being noted that the apparatus can be inverted). The driving arrangement will therefore not obstruct the area immediately adjacent the outer periphery of the indexing discs, thus allowing side entry of conduits into the indexing discs. A side-entry (i.e. horizontal) configuration will simplify the apparatus and render it more compact, whilst also reducing cost and complexity, especially insofar as small scale applications are concerned.

It should be noted that the exact configuration and design of the indexing discs, outer shell and inner core is not the subject matter of this particular invention, and that many different embodiments of these components can be utilized without departing from the novel and inventive aspect of this invention, being the internal drive arrangement as opposed to the external drive arrangement that has been used in the past.

It will be appreciated that the above is therefore only one embodiment of the invention and that there may be many variations without departing from the spirit and/or the scope of the invention.

The invention claimed is:
1. A rotary distribution arrangement including:
a stationary, cylindrical inner core;
a rotatable, cylindrical outer shell disposed about the inner core;

the inner core and the outer shell defining a plurality of annular fluid distribution chambers therebetween;

a rotatable indexing disc having a plurality of flow passages provided therethrough, connection ports of which are in flow communication with ports in the outer shell;

a stationary indexing disc having a plurality of flow passages provided therethrough, connection ports of which are in flow communication with suitable process vessels;

the flow passages in the rotatable indexing disc and the stationary indexing disc also having indexing ports, the configuration being such that the indexing ports in the rotatable indexing disc and the indexing ports in the stationary indexing disc are in use axially aligned, and wherein rotation of the rotatable indexing disc results in the indexing ports of the rotatable indexing disc being selectively in flow communication with selected indexing ports of the stationary indexing disc, so as to selectively alter the flow paths through the rotary distribution arrangement;

characterized in that the rotary distribution arrangement includes a driving arrangement that comprises:

a stationary shaft to which the stationary core is secured;

a rotatable sleeve rotatable about the stationary shaft, the rotatable sleeve driving the rotatable outer shell and the rotatable indexing disc; and the stationary shaft and the rotatable sleeve being located inside, and on a central axis of, the rotary distribution arrangement, in order for no part of the driving arrangement to be located radially outwardly of the indexing discs.

2. The rotary distribution arrangement of claim 1 in which the rotatable sleeve is driven by a driving means located axially outwardly of the stationary indexing disc.

3. The rotary distribution arrangement of claim 1 or claim 2 in which the rotatable sleeve is connected to a driving disc, which in turn drives the rotatable indexing disc and the rotatable outer shell.

4. The rotary distribution arrangement of claim 3 in which the connecting ports of the rotatable indexing disc and/or the stationary indexing disc are located on circumferentially outer faces of the indexing discs.

5. The rotary distribution arrangement of claim 1 in which the stationary shaft extends through the driving means, with an outer end thereof being secured to a stationary structure.

6. The rotary distribution arrangement of claim 5 in which the stationary structure is in the form of a housing of a gearbox forming part of the driving means.

7. The rotary distribution arrangement of claim 5 in which the stationary structure is the stationary indexing disc.

8. The rotary distribution arrangement of claim 1 in which the connecting ports of the rotatable indexing disc and/or the stationary indexing disc are located on circumferentially outer faces of the indexing discs.

* * * * *